United States Patent
Chan et al.

(10) Patent No.: US 12,475,112 B2
(45) Date of Patent: Nov. 18, 2025

(54) GENERATING HIERARCHICAL QUERIES FROM NATURAL LANGUAGE

(71) Applicant: ADOBE INC., San Jose, CA (US)

(72) Inventors: Yeuk-Yin Chan, San Jose, CA (US); Victor S. Bursztyn, Mountain View, CA (US); Eunyee Koh, Sunnyvale, CA (US); Nathan Ross, Highland, UT (US); Vasanthi Holtcamp, Fremont, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/486,603

(22) Filed: Oct. 13, 2023

(65) Prior Publication Data

US 2025/0124023 A1  Apr. 17, 2025

(51) Int. Cl.
*G06F 16/20* (2019.01)
*G06F 16/242* (2019.01)

(52) U.S. Cl.
CPC ........ *G06F 16/243* (2019.01); *G06F 16/2423* (2019.01)

(58) Field of Classification Search
None
See application file for complete search history.

(56) References Cited

U.S. PATENT DOCUMENTS

| | | | | |
|---|---|---|---|---|
| 9,015,093 | B1 * | 4/2015 | Commons | G06N 3/04 706/26 |
| 2017/0060831 | A1 * | 3/2017 | Smythe | G06F 40/289 |
| 2021/0295822 | A1 * | 9/2021 | Tomkins | G06F 16/3338 |
| 2022/0059083 | A1 * | 2/2022 | Muller | G06N 3/044 |
| 2022/0067037 | A1 * | 3/2022 | Ranganathan | G06F 16/24539 |
| 2022/0245140 | A1 * | 8/2022 | Gylfason | G06F 16/2425 |
| 2023/0090050 | A1 * | 3/2023 | Kellner | G06F 16/2425 707/715 |
| 2023/0342383 | A1 * | 10/2023 | Xia | G06F 16/3344 |
| 2024/0134850 | A1 * | 4/2024 | Xu | G06F 16/24522 |

OTHER PUBLICATIONS

1Chen, et al., "Evaluating Large Language Models Trained on Code", arXiv preprint arXiv:2107.03374v2 [cs.LG] Jul. 14, 2021, 35 pages.
2Ni, et al., "Sentence-T5: Scalable Sentence Encoders from Pre-trained Text-to-Text Models", arXiv preprint arXiv:2108.08877v3 [cs.CL] Dec. 14, 2021, 11 pages.
3Scholak, et al., "Picard: Parsing Incrementally for Constrained Auto-Regressive Decoding from Language Models", arXiv preprint arXiv:2109.05093v1 [cs.CL] Sep. 10, 2021, 7 pages.

(Continued)

*Primary Examiner* — Jau Shya Meng
(74) *Attorney, Agent, or Firm* — F. CHAU & ASSOCIATES, LLC

(57) ABSTRACT

The present disclosure relates to generating hierarchical queries from text queries. A query generation system is configured to encode a text query to obtain a text embedding. Then, the system may select a field of a data schema by comparing the text embedding to a field embedding corresponding to the field. Subsequently, the system may generate a hierarchical query including a value corresponding to the selected field. Some implementations of the system may further include one or more formatting models configured to format values included in the text query.

20 Claims, 15 Drawing Sheets

(56) References Cited

OTHER PUBLICATIONS

4Zhao, et al., "Importance of Synthesizing High-quality Data for Text-to-SQL Parsing", arXiv preprint arXiv:2212.08785v1 [cs.CL] Dec. 17, 2022, 9 pages.
5Li, et al., "RESDSQL: Decoupling Schema Linking and Skeleton Parsing for Text-to-SQL", arXiv preprint arXiv:2302.05965v3 [cs.CL] Apr. 10, 2023, 9 pages.
6Fu, et al., "CatSQL: Towards Real World Natural Language to SQL Applications", 2023, in Proceedings of the VLDB Endowment, vol. 16, No. 6 ISSN 2150-8097, found on the internet at https://github.com/asfuhan/CatSQL.git, DOI:10.14778/3583140.3583165, pp. 1534-1547.

\* cited by examiner

GENERATING HIERARCHICAL QUERIES FROM NATURAL LANGUAGE

BACKGROUND

The following relates generally to natural language processing, and more specifically to generating queries from natural language description. Natural Language Processing (NLP) studies the interaction between computers and human language. NLP enables computers to understand, interpret, and produce human language in meaningful ways. Tasks suitable for NLP range from breaking down text into meaningful elements, identifying grammatical components of words, recognizing named entities, determining text sentiment, and facilitating machine translation.

The recent advances in machine learning have enabled models that can generate text from a query. For example, large language models such as ChatGPT and DaVinci can produce natural language responses from natural language queries, and even render usable code. In some cases, such models are applied to generate queries to a database. However, conventional models frequently hallucinate incorrect syntax, do not adhere to a local schema, nor can produce hierarchical queries.

SUMMARY

Systems and methods for generating hierarchical queries from natural language are described. According to some aspects, a hierarchical query includes descriptors for segments of data, such that the descriptors are arranged in a hierarchy. Embodiments are configured to obtain a text query, and to extract key phrases from the text query and arrange the key phrases into a hierarchical order using a machine learning model. Some embodiments correspond the extracted key phrases to field names in a database schema. Embodiments further process the key phrases to identify values corresponding to the fields. For example, embodiments include a family of models configured to format the key phrases to match the database schema. In some examples, the family of models includes an operator detection model, a Boolean detection model, a date generation model, a value detection model, and a number formatting model. Then, embodiments compose a hierarchical query that is compatible with the database schema, and that matches the original hierarchy computed by the machine learning model. In this way, embodiments can generate hierarchical queries that match the schema of a database and do not include incorrect fields or values.

A method, apparatus, non-transitory computer readable medium, and system for generating queries from natural language description are described. One or more aspects of the method, apparatus, non-transitory computer readable medium, and system include encoding a text query to obtain a text embedding; selecting a field of a data schema by comparing the text embedding to a field embedding corresponding to the field; and generating a hierarchical query including a value corresponding to the selected field.

A method, apparatus, non-transitory computer readable medium, and system for generating queries from natural language description are described. One or more aspects of the method, apparatus, non-transitory computer readable medium, and system include initializing a machine learning model; obtaining training data including a text query and a ground-truth hierarchy of key phrases corresponding to the text query; and training the machine learning model to generate a hierarchy of key phrases based on the text query using the training data.

An apparatus, system, and method for generating queries from natural language description are described. One or more aspects of the apparatus, system, and method include at least one processor; at least one memory including instructions executable by the at least one processor; a machine learning model including parameters stored on the at least one memory and configured to generate a hierarchy of key phrases from a text query; a key phrase mapping component configured to identify a field of a data schema, wherein the field corresponds to a key phrase of the hierarchy of key phrases; and a query composer configured to generate a hierarchical query including a value corresponding to the field.

DETAILED DESCRIPTION

Figure 1:
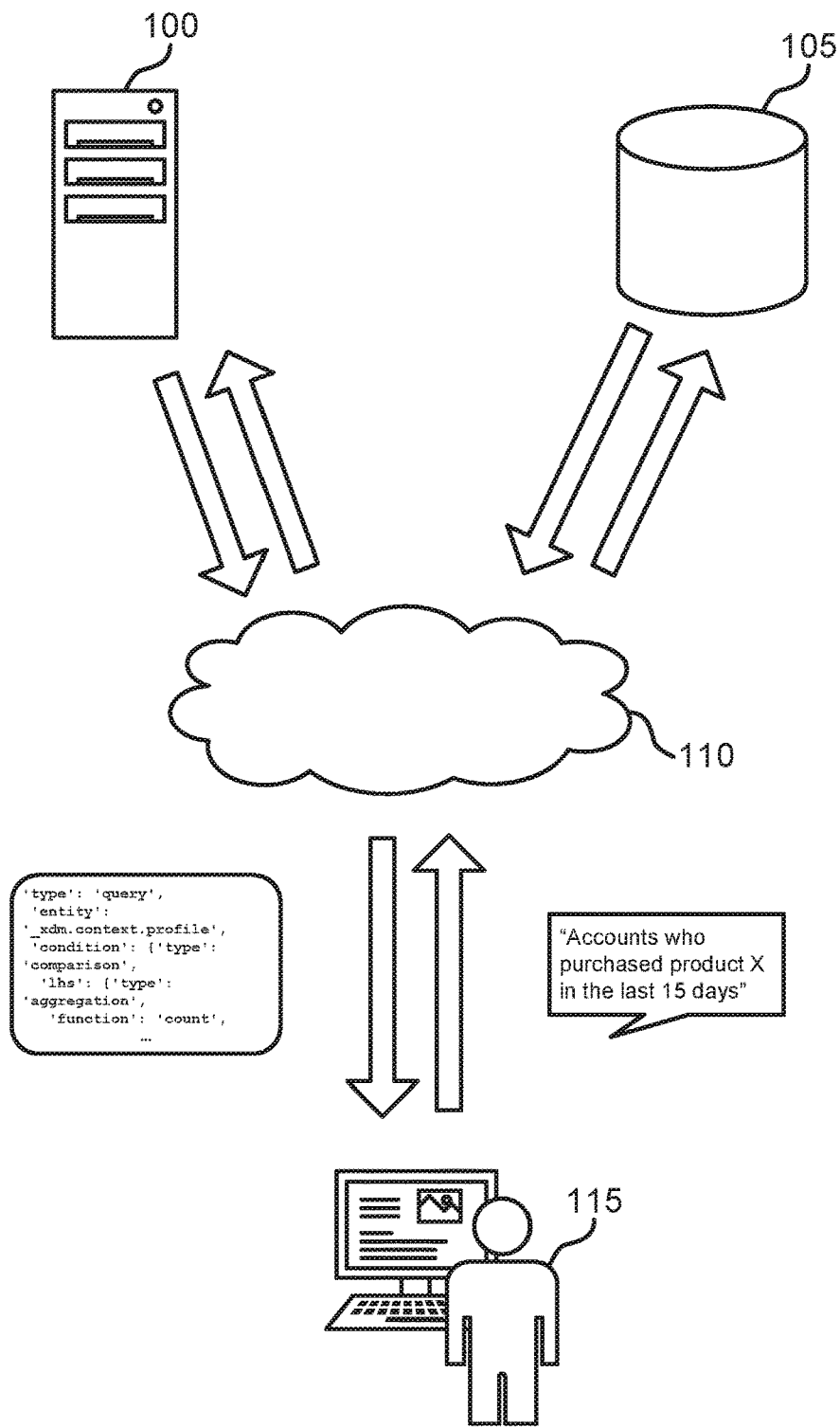
FIG. 1 shows an example of a query generation system according to aspects of the present disclosure.

Users often wish to obtain a segment of data from a database based on filters using a query. For example, users query a database to obtain a subset of accounts to, e.g., send targeted messages or media. In some cases, constructing these queries involves manually typing out the query request as, e.g., a JSON object. In other cases, a user constructs the query using a graphical user interface (GUI) by selecting options from drop-down menus and populating fields. These methods can be prohibitively time-consuming. Furthermore, they can require the user to know the particulars of the database schema before useful queries can be constructed.

There are some conventional methods for constructing queries based on natural language. Some methods include training machine learning models to generate flat queries based on natural language. Flat query refers to a query that is not hierarchical in structure. For example, a flat query does not have sub-queries in a tree structure or hierarchical relationships between different fields. For example, SQL queries are a type of flat query. There is a large amount of natural language to SQL training data; however, there is little available data to train a models to produce a hierarchical query end-to-end. Some conventional systems apply zero-shot or few-shots learning techniques on Large Language Models (LLMs) for text-to-query transformations. Despite requiring minimal task descriptions and examples during the inference stage, these systems can produce outputs that hallucinate fields or values, and that do not align with the database schema.

Embodiments of the present disclosure are configured to generate hierarchical queries from text prompts, where the hierarchical queries adhere to a database's schema. Embodiments include a machine learning model configured to extract key phrases from a text query and to arrange the key phrases into a hierarchy. A key phrase mapping component determines the corresponding fields and values of the schema from the key phrases. Embodiments further include formatting models that are configured to identify dates, operations, and Boolean logic from the text query, as well as to format the extracted values so as to be compatible with the schema. In this way, embodiments improve upon query generation systems by enabling the generation of queries from natural language descriptions, where the queries include hierarchically arranged filters, and do not include incorrect information.

As used herein, "hierarchical query" refers to a data structure with descriptors that are designed to filter data from a database. The descriptors include conditions and nested sub-conditions. According to some aspects, a hierarchical query is formed as a JavaScript Object Notation (JSON) object. A hierarchical query is differentiated from other queries, e.g., SQL queries, in that the hierarchical query conforms to hierarchical relationships of a hierarchical database schema, e.g., as opposed to performing relational operations between table-based databases. In some cases, a hierarchical has a tree structure with multiple attributes at each of multiple levels of the hierarchy.

As used herein, a "database schema" refers to a structured blueprint that outlines the organization and governing rules of data in a database. A schema can specify attributes, which include a field, a value, the allowed types of the values, and the allowed relationships between the field and the value. The schema can further specify the layer sand tree-like structures of a hierarchical data representation.

As used herein, a "key phrase" refers to one or more words in the text query that are identified by a machine learning model to correspond to a field in the database schema. In some cases, this extends to phrases that can correspond to fields or values.

A query generation system is described with reference to FIGS. 1-10. Methods for generating hierarchical queries from a text description and for using the queries to obtain data from a database are described with reference to FIGS. 11-12. Training methods are described with reference to FIGS. 13-14. A computing device configured to implement a query generation apparatus is described with reference to FIG. 15.

Query Generation System

An apparatus for generating queries from natural language description is described. One or more aspects of the apparatus include at least one processor; at least one memory including instructions executable by the at least one processor; a machine learning model including parameters stored on the at least one memory and configured to generate a hierarchy of key phrases from a text query; a key phrase mapping component configured to identify a field of a data schema, wherein the field corresponds to a key phrase of the hierarchy of key phrases; and a query composer configured to generate a hierarchical query including a value corresponding to the field.

Some examples of the apparatus, system, and method further include a text encoder configured to generate a text embedding from the text query. In at least one embodiment, the text encoder is a part of, or incorporated into, the machine learning model.

Some examples of the apparatus, system, and method further include an operator detection model configured to identify a mathematical operator in the text query. Some examples further include a value detection model configured to identify a discrete value in the text query. Some examples further include a Boolean detection model configured to identify a negation in the text query. Some examples further include a date generation model configured to identify a date from the text query. In some aspects, the data generation model is further configured to format the identified date, or to generate additional content for the date to make the date compatible in the hierarchical query.

FIG. 1 shows an example of a query generation system according to aspects of the present disclosure. The example shown includes query generation apparatus 100, database 105, network 110, and user interface 115. Query generation apparatus 100 is an example of, or includes aspects of, the corresponding element described with reference to FIG. 2.

In an example process, a user provides a text query to the system via user interface 115. The text query is a short description of the type of data they wish to retrieve from database 105. For example, the text query describes the types of accounts the user wishes to retrieve from the database, e.g., "accounts who purchased product X in the last 15 days." Then, a query generation apparatus 100 processes the text query to extract key phrases and to infer hierarchical information, and generates a hierarchical query based on the key phrases and the hierarchical information. In some cases, the system provides the hierarchical query to the user via user interface 115 for approval or further editing.

According to some aspects, one or more components of query generation apparatus 100 are implemented on a server. A server provides one or more functions to users linked by way of one or more of the various networks 110. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) is also used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Query generation apparatus 100 is configured to generate queries that are machine understandable to identify data segments in a database, such as 105. For example, a database controller processes the query to identify data segments that match the query. A database is an organized collection of data. For example, database 105 stores data in a specified format known as a schema. A database is structured as a single database, a distributed database, multiple distributed databases, or an emergency backup database. In some cases, a database controller manages data storage and processing in a database 105. In some cases, a user interacts with the database controller. In other cases, the database controller operates automatically without user interaction. Database 105 is also used to store other information used by the system, such as schema metadata, machine learning model parameters, training data, and other data.

Network 110 is configured to facilitate the transfer of information between query generation apparatus 100, database 105, and user interface 115. In some cases, network 110 is referred to as a "cloud". A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User interface 115 is configured to enable a user to interact with a device. In some embodiments, the user interface 115 includes an audio device, such as an external speaker system, an external display device such as a display screen, or an input device (e.g., remote control device interfaced with the user interface 115 directly or through an IO controller module). In some cases, a user interface 115 is a graphical user interface 115 (GUI). According to some aspects, user interface 115 comprises a local device, inputs, and a GUI configured to provide a user access to the functionality and outputs of query generation apparatus 100. In at least one embodiment, user interface 115 is a part of query generation apparatus 100.

Figure 2:
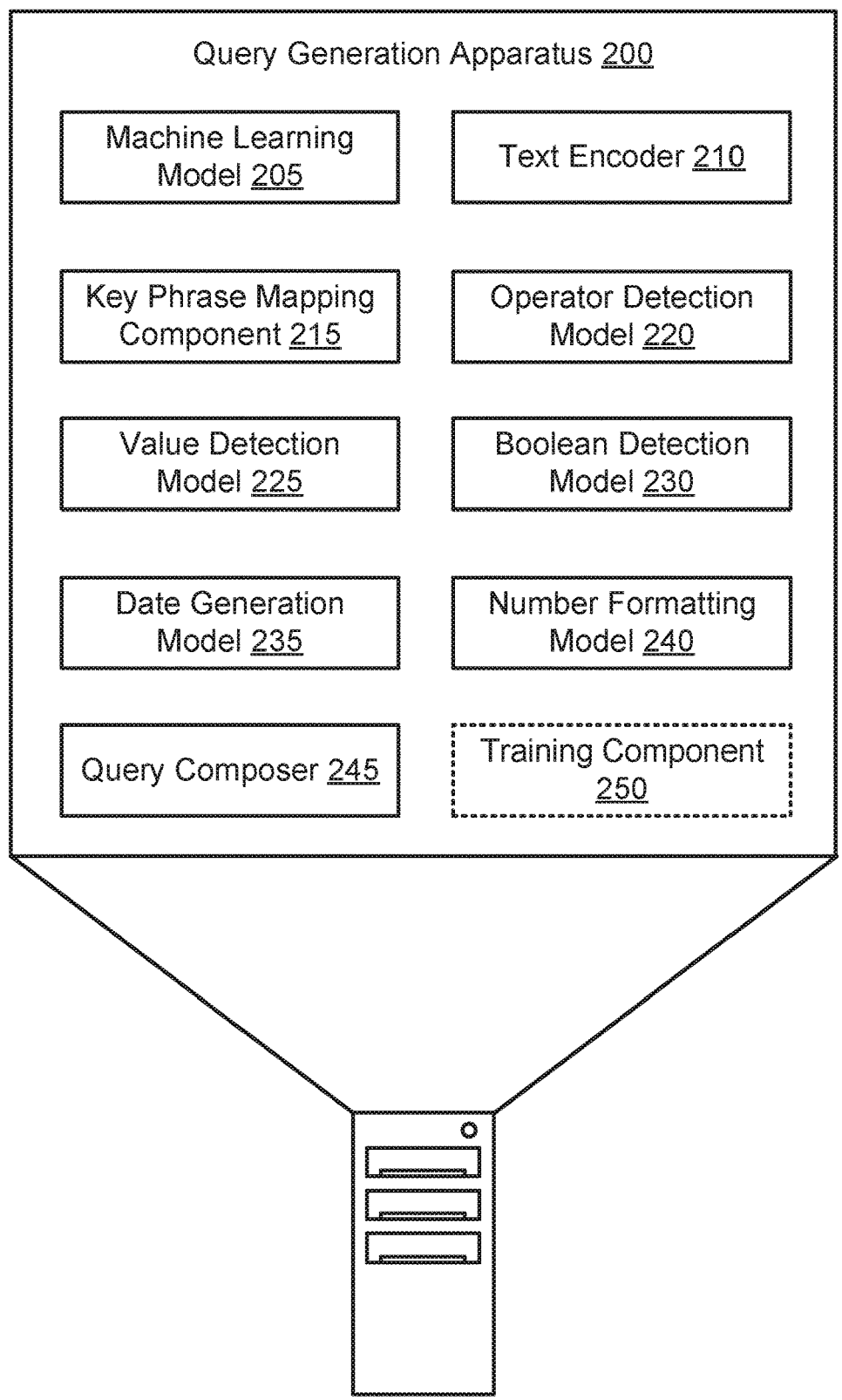
FIG. 2 shows an example of a query generation apparatus according to aspects of the present disclosure.

FIG. 2 shows an example of a query generation apparatus 200 according to aspects of the present disclosure. The example shown includes query generation apparatus 200, machine learning model 205, text encoder 210, key phrase mapping component 215, operator detection model 220, value detection model 225, Boolean detection model 230, date generation model 235, number formatting model 240, query composer 245, and training component 250.

Machine learning model 205 is an example of, or includes aspects of, the corresponding element described with reference to FIGS. 3, 4, and 13. Text encoder 210 is an example of, or includes aspects of, the corresponding element described with reference to FIGS. 3 and 5. Key phrase mapping component 215 is an example of, or includes aspects of, the corresponding element described with reference to FIG. 3. Operator detection model 220 is an example of, or includes aspects of, the corresponding element described with reference to FIGS. 3 and 6.

Value detection model 225 is an example of, or includes aspects of, the corresponding element described with reference to FIGS. 3 and 7. Boolean detection model 230 is an example of, or includes aspects of, the corresponding element described with reference to FIGS. 3 and 8. Date generation model 235 is an example of, or includes aspects of, the corresponding element described with reference to FIGS. 3 and 9. Number formatting model 240 is an example of, or includes aspects of, the corresponding element described with reference to FIGS. 3 and 10. Query composer 245 is an example of, or includes aspects of, the corresponding element described with reference to FIG. 3. Training component 250 is an example of, or includes aspects of, the corresponding element described with reference to FIG. 13.

Embodiments of query generation apparatus 200 include several components and sub-components. These components are variously named, and are described so as to partition the functionality enabled by the processor(s) and the executable instructions included in the computing device used to implement query generation apparatus 200 (such as the computing device described with reference to FIG. 15). The partitions are implemented physically, such as through the use of separate circuits or processors for each component, or are implemented logically via the architecture of the code executable by the processors.

Some components of query generation apparatus 200, such as machine learning model 205, includes an artificial neural network. An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Embodiments of machine learning model 205 and text encoder 210 include a transformer network. A transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

In some embodiments, machine learning model 205, text encoder 210, key phrase mapping component 215, operator detection model 220, value detection model 225, Boolean detection model 230, date generation model 235, and number formatting model 240 each comprise a language model (LM), large language model (LLM), or one or more subcomponents of an LM. An LM is a type of computational model utilized for predicting the likelihood of a sequence of words. LMs assign probability scores to sequences of words based on their occurrence in training data. Modern LMs, especially neural-based LMs, are able to capture longer dependencies by leveraging deep learning architectures.

In LM architectures, words or subwords are represented as embeddings, which are high-dimensional vectors capturing semantic and syntactic information. These embeddings are processed by layers of neurons, often involving recurrent, convolutional, or transformer-based structures. For instance, in recurrent neural networks (RNNs), the information flows sequentially, with the model maintaining a 'memory' of previous words in the form of its internal state. This allows for the modeling of temporal dependencies in text.

A principle behind LMs is the distributional hypothesis, which posits that words that appear in similar contexts tend to have similar meanings. As such, by training on large volumes of text data, LMs internalize the patterns, structures, and relationships present in the language. The training objective for LMs is typically to maximize the likelihood of predicting the next word in a sequence given its predecessors.

Attention mechanisms, as described in transformer architectures, are also frequently integrated into modern LMs to weigh the importance of different words in a sequence when making predictions. This allows the model to focus on more relevant portions of the input data for the task at hand.

In some advanced LMs, such as generative pre-trained transformers (GPT), the model is fine-tuned on specific tasks post pre-training, allowing for a transfer of knowledge from general language understanding to specific applications. These models utilize layers of transformer blocks, consisting of multi-head attention and feed-forward networks, to process and generate text sequences. The LMs are fine tuned to tasks such as formatting texts, detecting operators and Boolean logic, and others.

Machine learning model 205 is configured to generate key phrases from a text query and arrange the key phrases into a hierarchy. For example, machine learning model 205 identifies words in the text query that correspond to a key phrase, and remove words that do not belong to a key phrase.

In some examples, machine learning model 205 generates a hierarchy of key phrases for the text query, where the key phrase corresponds to a node in the hierarchy. In some examples, machine learning model 205 generates a list of key phrases for the text query, where the key phrase corresponds to an element of the list. Additional detail and examples of key phrases and hierarchies will be described with reference to FIG. 4.

Text encoder 210 is configured to encode a text query to obtain a text embedding. Embodiments of text encoder 210 include a transformer model, such as a text-to-text Transfer Transformer (T5). The T5 model is configured to produce a response based on a query. In some cases, text encoder 210 includes only a portion of the T5 model, when the output of text encoder 210 is a text embedding rather than a natural language text response. For example, text encoder 210 includes one or more intermediate layers of a T5 model.

Key phrase mapping component 215 is configured to map key phrases extracted from a text query to their corresponding fields in a database schema. Some embodiments of key phrase mapping component 215 compare a text embedding produced by text encoder 210 to other embeddings in an embedding space, and identify the corresponding field in the schema based on the comparison. For example, if the text query includes a key phrase "gold accounts", then key phrase mapping component 215 compares the embedding of "gold accounts" to an embedding of a "user loyalty level" field in the database schema, and return "user loyalty level" based on the similarity between the embeddings. The text embedding such as the embedding of "gold accounts" and the field embedding such as embedding of "user loyalty level" field are in the same embedding space. The similarity is determined by, e.g., the distance between embeddings in the embedding space, or the cosine similarity between embeddings. In some embodiments, key phrase mapping component 215 ranks the fields based on the similarity. In some examples, key phrase mapping component 215 returns the most similar field, e.g., the top-1 of the ranked results. However, embodiments of the present disclosure are not limited thereto. In some examples, the key phrase mapping component 215 is configured to return additional results, e.g., the top-k of the results, which can be suggested as alternatives via the user interface, where k is an integer greater than 1. In some cases, key phrase mapping component 215 obtains a database schema as input, where the schema includes the field names and the types of values for the field names.

Operator detection model 220 is configured to determine the correct operators for insertion in the hierarchical query. In some embodiments, a hierarchical query includes descriptors used to filter data in the database. The descriptors includes conditions which describe the desired data, and each condition includes a left-hand side "lhs", a right hand side "rhs", and an operator that compares the left-hand side to the right hand side. For example, for the text query "customers who purchased product XYZ", the left-hand side is 'property', the right hand side is 'XYZ', and the operator is 'equals.' Additional operators includes 'and', '>=', 'in_time_interval', and others as supported by the database. These conditions can be implemented as key-value pairs. The descriptors and the constituent conditions of the hierarchical query may correspond to the hierarchical relationships of a hierarchical database schema, e.g., as opposed to performing relational operations between table-based databases. Embodiments of operator detection model 220 are based on a language model, such as T5. Additional detail regarding the operator detection model 220 will be described with reference to FIG. 6.

Value detection model 225 is configured to identify a discrete value from the text query. Each field identified by key phrase mapping component 215 has a corresponding value. The value is inserted into the generated hierarchical query by query composer 245. In some cases, the left-hand side of a condition or sub-condition includes a field, while the right hand side includes the corresponding value. Embodiments of value detection model 225 include a transformer ANN such as a LM. Additional detail regarding the value detection model 225 will be provided with reference to FIG. 7.

According to some aspects, Boolean detection model 230 is configured to identify a negation in the text query. For example, the text query specifies data that does not include a particular attribute or that does not have a particular value for an attribute. The Boolean detection model 230 can detect this as a "false" value so that the hierarchical query is composed correctly. Some embodiments of Boolean detection model 230 include a trained LM configured to identify Boolean logic in a text query. Some embodiments of Boolean detection model 230 include code configured to identify "negation"-type words based on a collection of such words. "Negation"-type words include "not", "aren't", "haven't" and the like.

According to some aspects, date generation model 235 is configured to identify a date from the text query. Embodiments of date generation model 235 include an LM trained to identify time and date entities in the text query. Some embodiments utilize a linguistics model for the identification. A linguistics model is, for example, a rule-based algorithm configured to parse, detect, modify, and insert strings from a text query. In some examples, date generation model 235 is further configured to classify the identified entities. For example, a schema includes the following classifications for times and dates: relative time, e.g., today, this month, this year, past rolling time, e.g., 1 hour ago, previous two months, and future rolling time, e.g., next 3 days, coming hour, etc. This classification is used by query composer 245 to correctly insert a left or right hand side value. Additional detail regarding the date generation model 235 will be described with reference to FIG. 9.

According to some aspects, number formatting model 240 is configured to generate a number value from the text query. For example, the text query includes a number value that does not conform to a database schema, such as "3.4M". The number formatting model 240 converts "3.4M" to "3400000", which is then inserted into the generated hierarchical query. Embodiments of number formatting model 240 include a trained LM configured to identify or infer number information from the text query (e.g., in the above case, the LM can infer "million" from "3.4M). Some embodiments further include a linguistics model to convert from words to number values, e.g., from "million" to "1000000". Additional detail regarding this process will be described with reference to FIG. 10.

According to some aspects, query composer 245 generates a hierarchical query based on the outputs from the aforementioned components of query generation apparatus 200. Embodiments of query composer 245 include code executable by one or more processor(s) to combine outputs from machine learning model 205, key phrase mapping component 215, operator detection model 220, value detection model 225, Boolean detection model 230, date generation model 235, and number formatting model 240, into a base hierarchical query specification to generate the hierarchical query. Query composer 245 identifies the hierarchy of the fields and values from the output of machine learning model 205. For example, machine learning model 205 encodes hierarchical information by grouping the key phrases using brackets, or similar. Query composer 245 then creates a hierarchical query that includes descriptors that are appropriately arranged and nested based on the hierarchical information.

According to some aspects, training component 250 trains the machine learning model 205 to generate a hierarchy of key phrases based on the text query using training data. In some embodiments, training component 250 computes a loss based on the difference between the generated hierarchy of key phrases and the hierarchy of key phrases contained in the training data, and then updates machine learning model 205 based on the loss using, e.g., gradient descent. In some aspects, the text query includes a search query, and the ground-truth hierarchy of key phrases corresponds to fields in a hierarchical schema. In some examples, training component 250 sorts the training data based on length or hierarchical depth, where the training is based on the sorted training data. Additional detail regarding training is described with reference to FIGS. 13-14. In at least some embodiments, training component 250 further trains text encoder 210, key phrase mapping component 215, operator detection model 220, value detection model 225, Boolean detection model 230, date generation model 235, number formatting model 240, query composer 245, or a combination thereof in one training phase or in separate training phases.

Figure 3:
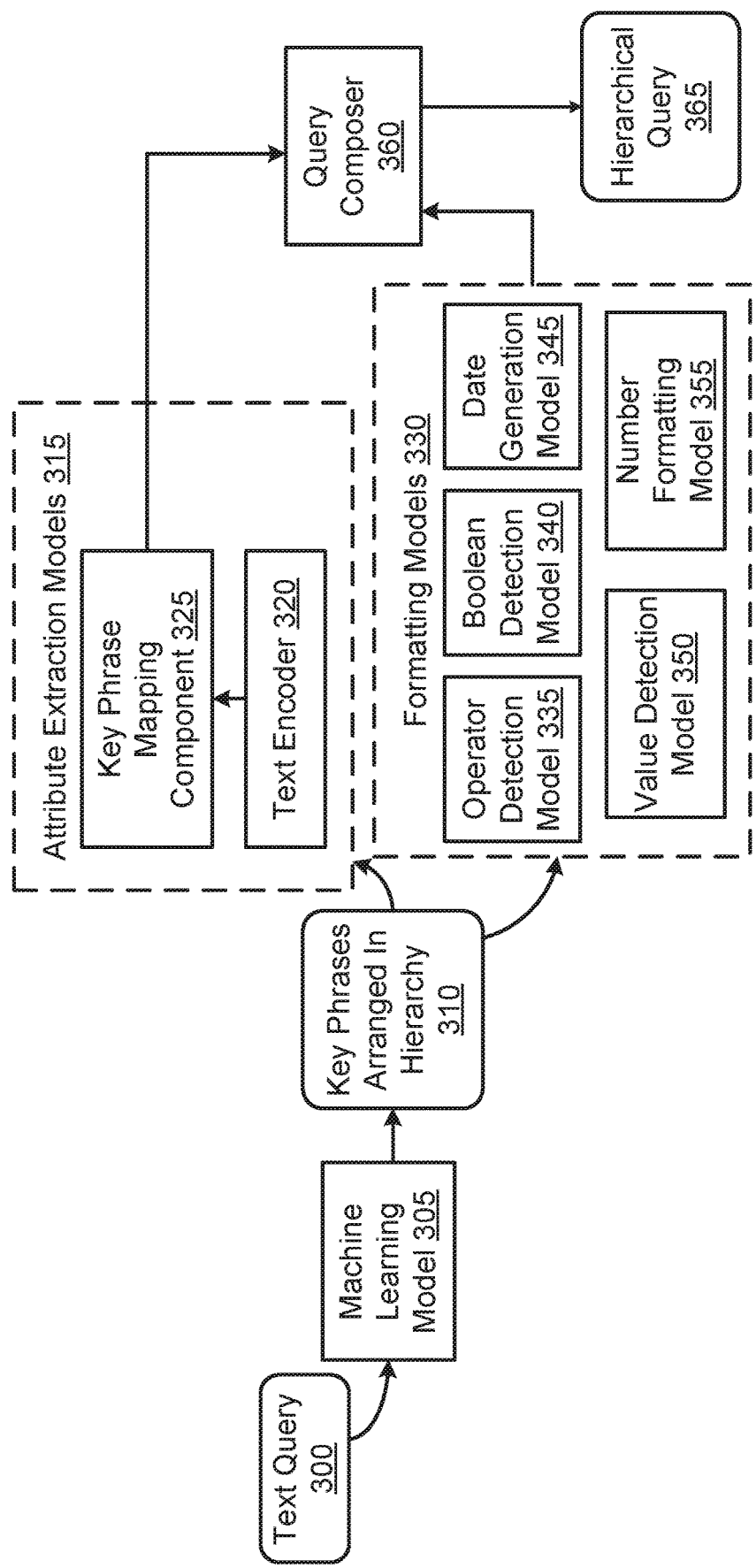
FIG. 3 shows an example of a hierarchical query generation pipeline according to aspects of the present disclosure.

FIG. 3 shows an example of a hierarchical query 365 generation pipeline according to aspects of the present disclosure. The example shown includes text query 300, machine learning model 305, key phrases arranged in hierarchy 310, attribute extraction models 315, formatting models 330, query composer 360, and hierarchical query 365.

Machine learning model 305 is an example of, or includes aspects of, the corresponding element described with reference to FIGS. 2, 4, and 13. Text encoder 320 is an example of, or includes aspects of, the corresponding element described with reference to FIGS. 2 and 5. Key phrase mapping component 325 is an example of, or includes aspects of, the corresponding element described with reference to FIG. 2.

Operator detection model 335 is an example of, or includes aspects of, the corresponding element described with reference to FIGS. 2 and 6. Boolean detection model 340 is an example of, or includes aspects of, the corresponding element described with reference to FIGS. 2 and 8. Date generation model 345 is an example of, or includes aspects of, the corresponding element described with reference to FIGS. 2 and 9. Value detection model 350 is an example of, or includes aspects of, the corresponding element described with reference to FIGS. 2 and 7. Number formatting model 355 is an example of, or includes aspects of, the corresponding element described with reference to FIGS. 2 and 10.

In the example shown, a user provides a text query 300 into the query generation apparatus, such as the one described with reference to FIG. 2. A machine learning model 305 extracts the key phrases from the text query 300 and infers their hierarchical order. For example, the machine learning model 305 receives the text query 300 and process it to generate key phrases arranged in hierarchy 310. Examples of key phrases arranged in a hierarchy are shown and described later with reference to FIG. 4.

The output of machine learning model 305, key phrases arranged in hierarchy 310, is then applied to both attribute extraction models 315 and formatting models 330. Attribute extraction models 315 are configured to identify attributes from text query 300. Attributes include a field, a value, and relationship between the field and the value. Attribute extraction models 315 ensure the key phrases from text query 300 are mapped correctly to the field names in a database schema. In some embodiments, though not represented in FIG. 3, the outputs from attribute extraction models 315 are also input to formatting models 330. Formatting models 330 are configured to ensure the values and relationships in the attributes are formatted correctly for the database schema. By using multiple sub-components, including machine learning model 305 trained on hierarchical ground-truth data and key phrase mapping component 325, embodiments are configured to generate a hierarchical query 365 that includes a correct hierarchical arrangement, and does not include hallucinated or incorrect information that is produced by an end-to-end Large Language Model. "Correct" in this context refers to the query's compatibility with a database.

In some cases, a database schema includes a blueprint or organizational layout of a database. For example, a schema includes a list of fields, and further specifies the value type(s) appropriate for those fields. In an example, a field named "Age" is specified to contain only integer values, and a field named "Email" is specified to contain string values that meet the format of an email address. Additionally, the schema includes one or more hierarchical rules that constrain how the fields can be used in a query when querying data. In at least one embodiment, the database schema is input to the system beforehand.

In one aspect, attribute extraction models 315 includes text encoder 320 and key phrase mapping component 325. Text encoder 320 generates a text embedding from key phrases arranged in hierarchy 310. In some cases, text encoder 320 generates a single text embedding that integrates all key phrases in key phrases arranged in hierarchy 310. In some cases, text encoder 320 generates a different text embedding for different sub-combination of the words in key phrases arranged in hierarchy 310, such as a different embedding for each word. Embodiments of text encoder 320 include a transformer model. For example, at least one embodiment of text encoder 320 is based on a T5 model, where an intermediate representation of the data within the T5 model is used as the text embedding.

Key phrase mapping component 325 receives the text embedding from text encoder 320, and compares the embedding to other embeddings of the database schema field names in an embedding space. In some embodiments, key phrase mapping component 325 pre-processes the database schema field names to populate the embedding space before the comparison. For example, the key phrase mapping component 325 pre-processes the database schema field names by cleaning, formatting, or converting the field names into a form that can be easily transformed into embeddings. Some examples of key phrase mapping component 325 compare the text embedding to the other embeddings by computing cosine similarities between them. The key phrase mapping component 325 matches the word represented by the text embedding to the database schema field name with an embedding that has the highest cosine similarity to the text embedding. In this way, embodiments are configured to compose a hierarchical query that is accurate to the schema of the database that is being queried.

Embodiments further include one or more formatting models 330 that also ensure the correctness of the generated hierarchical query 365. The formatting models 330 are used to identify and correctly format various types of data. In one aspect, formatting models 330 includes operator detection model 335, Boolean detection model 340, date generation model 345, value detection model 350, and number formatting model 355. Embodiments of the formatting models are based on transformer ANNs, such as LMs, and each formatting model among the detection model 335, Boolean detection model 340, date generation model 345, and value detection model 350 is trained for a particular task. In some cases, each formatting model includes one or more additional components aside from the LM, such as a linguistic model. Each of the formatting models is described in detail with reference to FIGS. 6-10.

Query composer 360 uses the field names identified by attribute extraction models 315 and the operators and values identified and generated from formatting models 330 to generate a hierarchical query 365. According to some aspects, query composer 360 includes one or more hierarchical query specifications, i.e. pre-defined hierarchical query templates, that query composer 360 alters to include the outputs from attribute extraction models 315 and formatting models 330 to generate hierarchical query 365. For example, the pre-defined templates are dynamically modified by the query composer 360 to incorporate output from the attribute extraction models 315 and the formatting models 330. The query composer 360 generates the final hierarchical query 365 based on the modified specifications. In some cases, query composer 360 incorporates the hierarchical information produced by machine learning model 360 to correctly arrange the attributes in hierarchical query 365, such as placing the attributes in an order and a nesting that correctly represents the hierarchy. Some embodiments of query composer 360 utilize multiple templates and combine the templates along with the information output from the system to generate hierarchical query 365. In at least one embodiment, hierarchical query 365 is formatted in JavaScript Object Notation (JSON) notation, though embodiments are not necessarily limited thereto.

Figure 4:
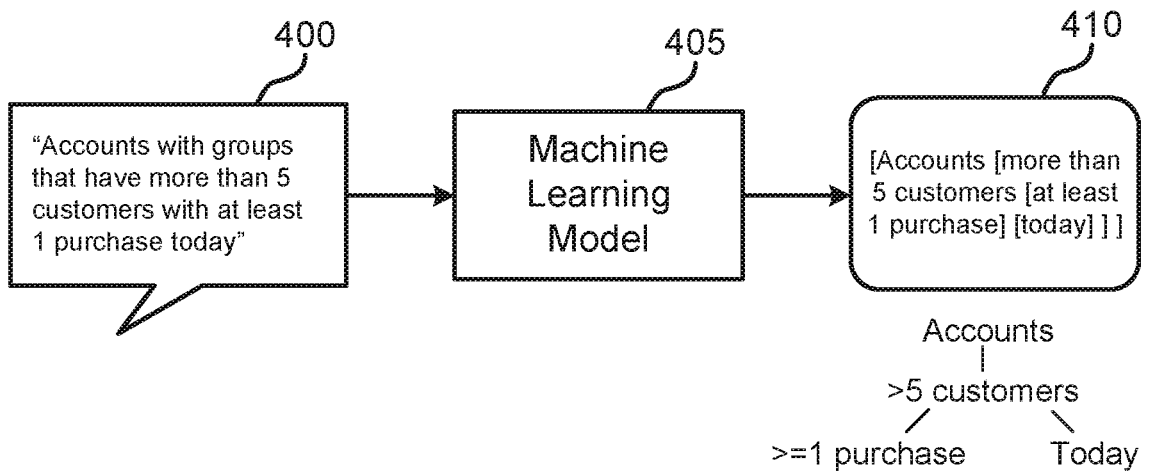
FIG. 4 shows an example of a machine learning model according to aspects of the present disclosure.
Figure 4:
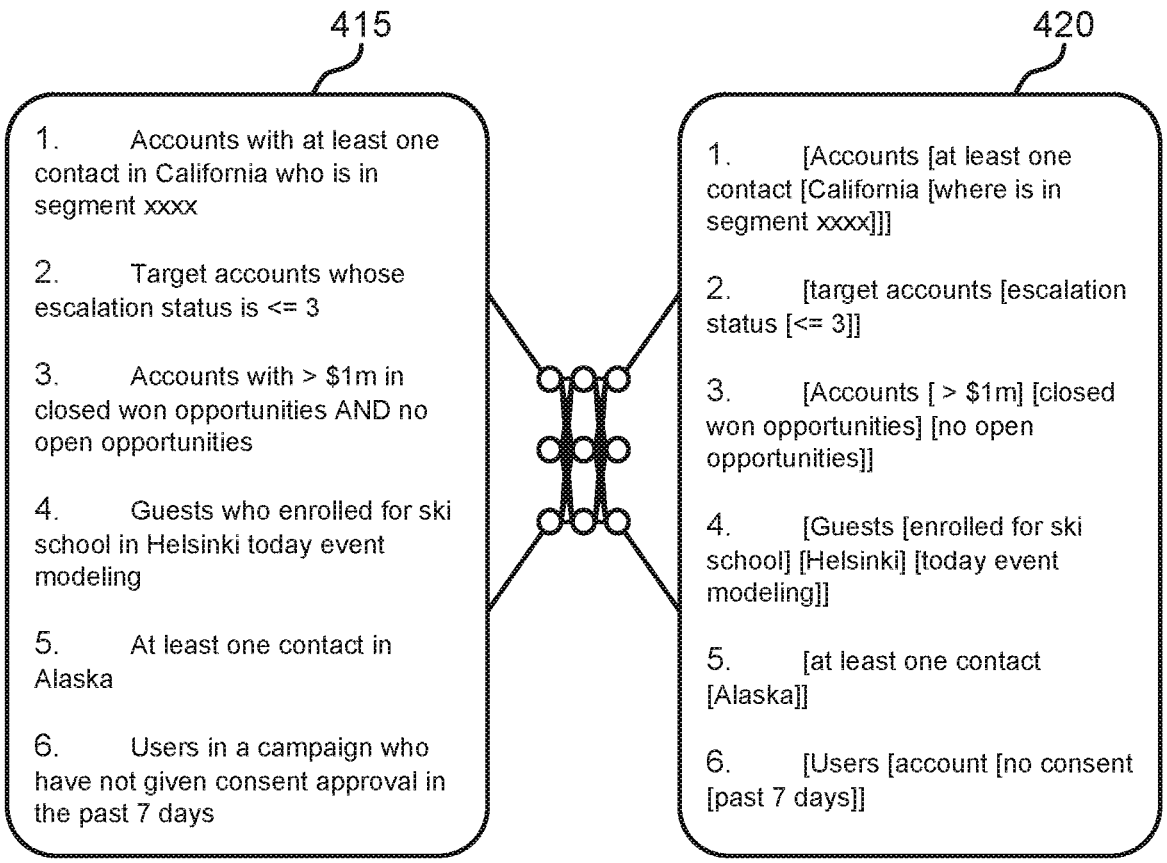

FIG. 4 shows an example of a machine learning model 405 according to aspects of the present disclosure. The example shown includes text query 400, machine learning model 405, key phrases arranged in hierarchy 410, example inputs 415, and example outputs 420. Machine learning model 405 is an example of, or includes aspects of, the corresponding element described with reference to FIGS. 2, 3, and 13.

Machine learning model 405 is configured to process a text query 400 to identify key phrases and to arrange the key phrases in a hierarchy, thereby producing key phrases arranged in hierarchy 410. In this example, machine learning model 405 processes a natural language text query "Accounts with groups that have more than 5 customers with at least 1 purchase today" to produce "[Accounts [more than 5 customers [at least 1 purchase] [today]]]". As represented by the tree structure in FIG. 4, the key phrase "Accounts" is a parent node in a hierarchy, the key phrase "more than 5 customers" is a child node of "Accounts" in the hierarchy, and the key phrases "at least one purchase" and "today" are children nodes of "more than 5 customers". In some examples, key phrases arranged in hierarchy 410 is sent to attribute extraction models and formatting models for pre-processing, and the output of the models is then sent to a query composer to generate a hierarchical query. Example inputs 415 illustrate a few examples of text queries capable of being processed by machine learning model 405, and example outputs 420 illustrate the corresponding outputs from machine learning model 405.

At least one embodiment of machine learning model 405 further includes a linguistics model. In some cases, if machine learning model 405 does not predict closed brackets, or does not break down longer sentences, the linguistics model is used to extract key phrases based on part-of-speech (POS) and entity extraction. POS techniques are used to break down a sentence (e.g., text query 400) based on pronouns (PRON), punctuations (PUNCT), coordinating conjunction (CCONJ), subordinating conjunction (SCONJ), and determiner (DET) identification. Entity extraction techniques are also used to extract number entities (e.g., CARDINAL, GPE, MONEY) or name entities from text query 400.

Figure 5:
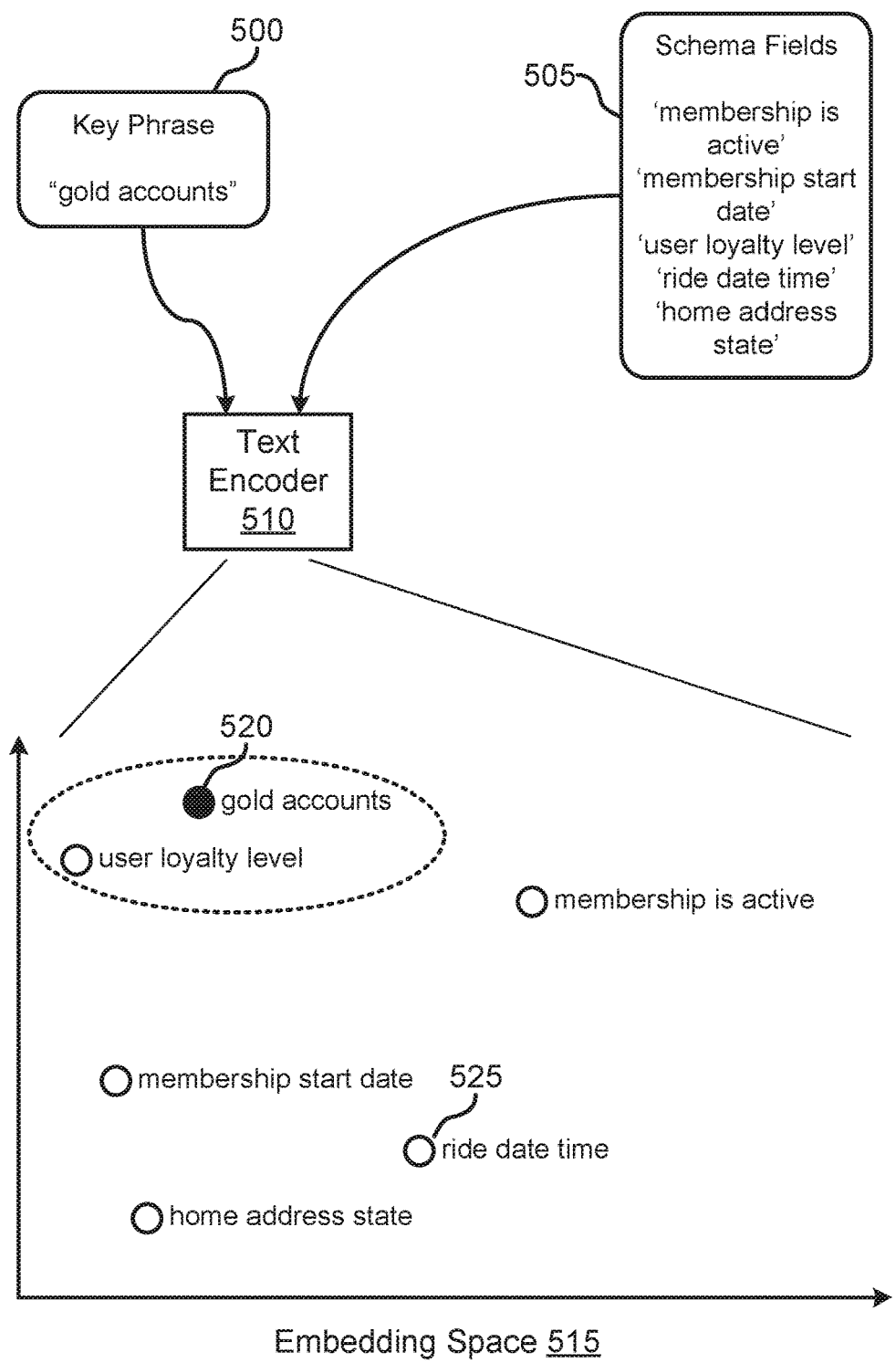
FIG. 5 shows an example of a key phrase mapping pipeline according to aspects of the present disclosure.

FIG. 5 shows an example of a key phrase 500 mapping pipeline according to aspects of the present disclosure. The example shown includes key phrase 500, schema fields 505, text encoder 510, and embedding space 515. Text encoder 510 is an example of, or includes aspects of, the corresponding element described with reference to FIGS. 2 and 3.

In the example pipeline shown, text encoder 510 encodes both key phrase 500 and schema fields 505 to produce key phrase embedding 520 and field name embedding 525 in a shared embedding space, e.g. embedding space 515. Embodiments of text encoder 510 include an LM such as the T5 model, or a part of the language model. According to some aspects, text encoder 510 is pre-trained to encode texts with similar meanings to have similar embeddings. In some cases, text encoder 510 populates the embedding space 515 with field name embeddings of a database schema in a preprocessing step.

A key phrase mapping component, such as the one described with reference to FIGS. 2-3, searches the embedding space 515 to identify the field name embedding 525 that is most similar to key phrase embedding 520. In the example shown, the field name embedding 525 that is closest to key phrase embedding 520 is the embedding for the field name "user loyalty level". Accordingly, the key phrase mapping component returns the field name "user loyalty level" as the mapped field name to the key phrase "gold accounts". According to some aspects, the similarity between embeddings is measured by computing, e.g., a cosine similarity between pairs of embeddings.

Figure 6:
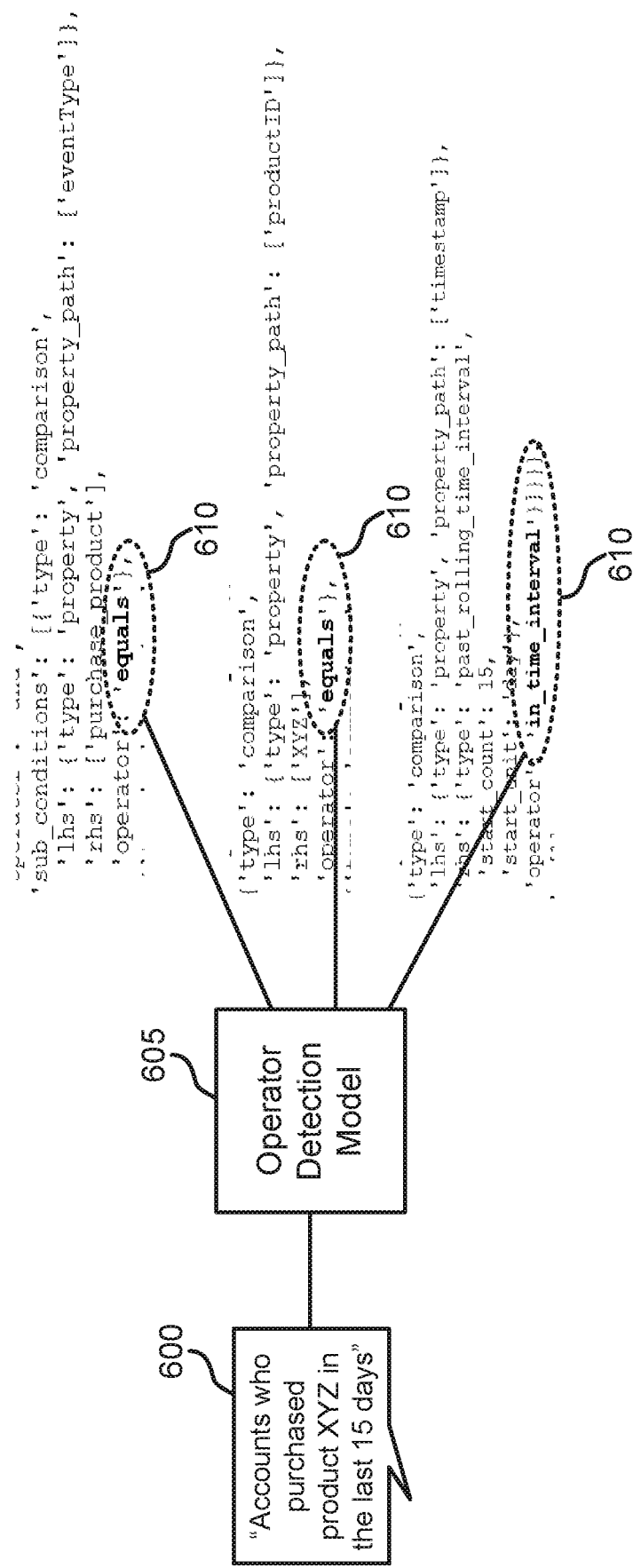
FIG. 6 shows an example of an operator detection pipeline according to aspects of the present disclosure.

FIG. 6 shows an example of an operator detection pipeline according to aspects of the present disclosure. The example shown includes text query 600, operator detection model 605, and detected operators 610. Operator detection model 605 is an example of, or includes aspects of, the corresponding element described with reference to FIGS. 2 and 3.

In the example pipeline shown, an operator detection model 605 processes text query 600 to identify detected operators 610. Embodiments of operator detection model 605 include an LM that is trained to identify the operators described in a text query. In some cases, operator detection model 605 is trained using a few-shot learning process during which operator detection model 605 learns to determine which operator is described in a text query, given a subset of supported operators in a database schema. Accordingly, operator detection model 605 accurately outputs the operators supported by the database schema. In some examples, the detected operators 610 are sent to a query composer to be incorporated into a hierarchical query.

Figure 7:
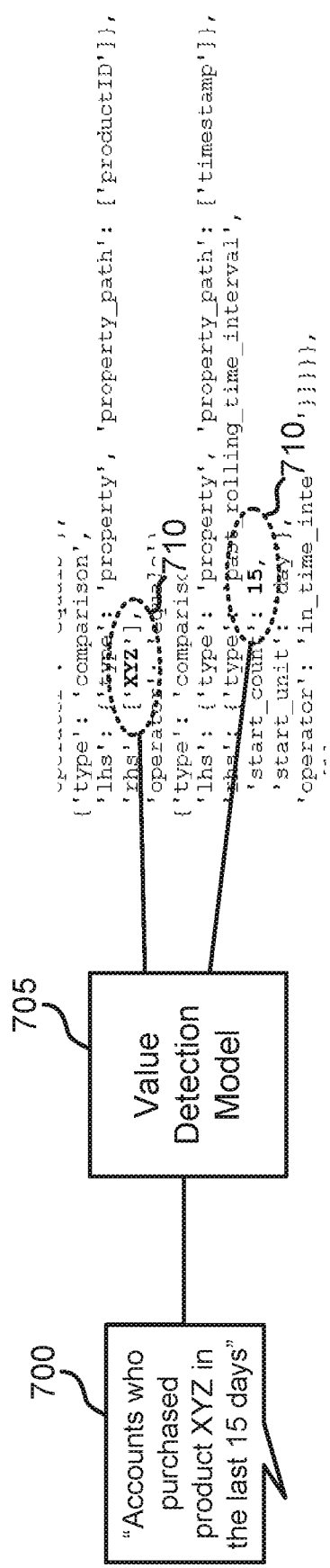
FIG. 7 shows an example of a value detection pipeline according to aspects of the present disclosure.

FIG. 7 shows an example of a value detection pipeline according to aspects of the present disclosure. The example shown includes text query 700, value detection model 705, and detected values 710. Value detection model 705 is an example of, or includes aspects of, the corresponding element described with reference to FIGS. 2 and 3.

In the example pipeline shown, value detection model 705 processes text query 700 to identify detected values 710. Embodiments of value detection model 705 include an LM that is trained to identify values, as differentiated from field names, in a text query. A field name and its associated value are included in the attributes of a hierarchical query that are used to identify a subset of data. The LM or other model used in embodiments of value detection model 705 are also trained according to a few-shot learning process. In some examples, the detected values 710 are sent to a query composer to be incorporated into a hierarchical query.

Figure 8:
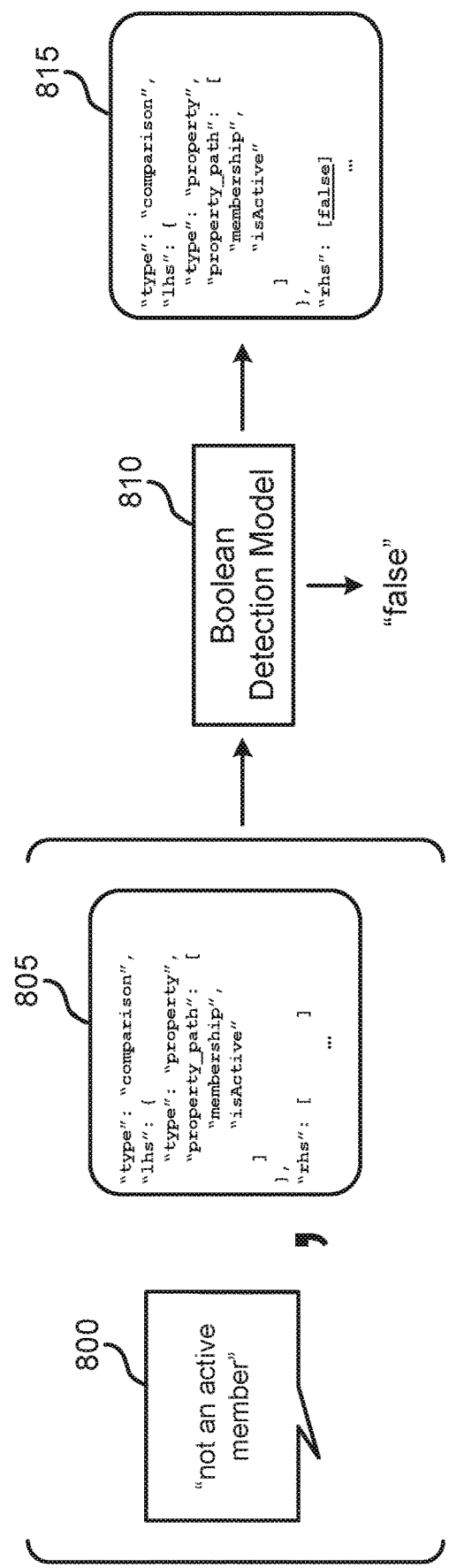
FIG. 8 shows an example of a Boolean detection pipeline according to aspects of the present disclosure.

FIG. 8 shows an example of a Boolean detection pipeline according to aspects of the present disclosure. The example shown includes key phrase 800, hierarchical query specification for Boolean variable 805, Boolean detection model 810, and hierarchical query 815. Boolean detection model 810 is an example of, or includes aspects of, the corresponding element described with reference to FIGS. 2 and 3.

In the example pipeline shown, Boolean detection model 810 processes key phrase 800 and a template, such as hierarchical query specification for Boolean variable 805, to produce hierarchical query 815. The hierarchical query 815 is only a portion of a final hierarchical query. For example, a query composer incorporates the hierarchical query 815 into a larger hierarchical query. In some embodiments, Boolean detection model 810 process the key phrase 800, and outputs a simple "True" or "False" Boolean value for use by the query composer. Embodiments of Boolean detection model 810 include an LM trained to identify a negation in a string of text. In some embodiments, Boolean detection model 810 does not include an LM, and rather identifies "negation words" based on a collection of words. For example, in such cases, Boolean detection model 810 includes a set of rule-based code configured to detect the negation words using, e.g., Regular Expressions.

Figure 9:
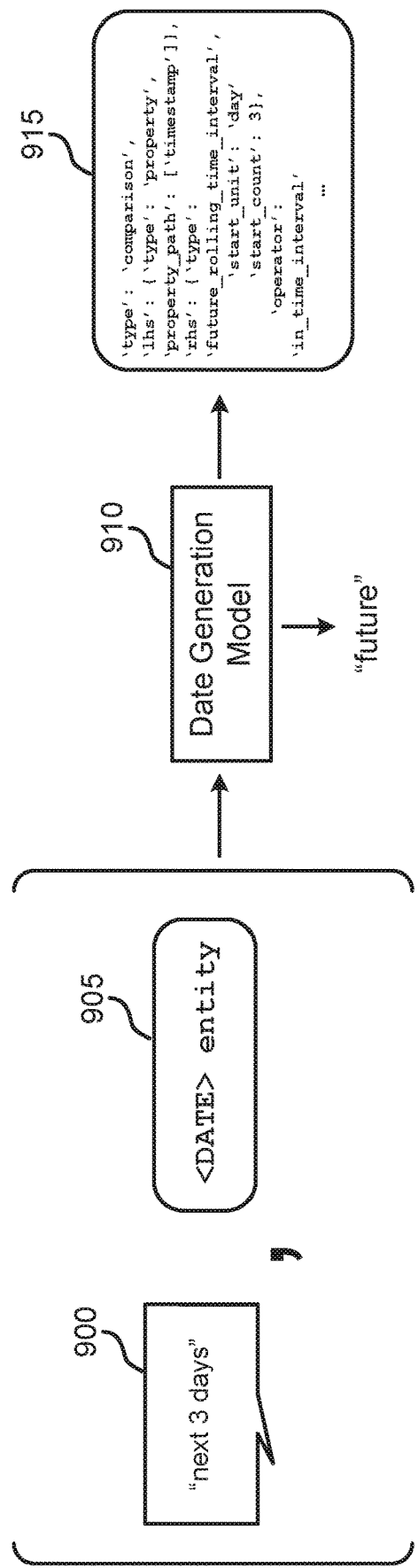
FIG. 9 shows an example of a date generation pipeline according to aspects of the present disclosure.

FIG. 9 shows an example of a date generation pipeline according to aspects of the present disclosure. The example shown includes key phrase 900, date generation model 905, detected entity 910, and hierarchical query 915. Date generation model 905 is an example of, or includes aspects of, the corresponding element described with reference to FIGS. 2 and 3.

In the example pipeline shown, date generation model 905 processes key phrase 900 and a detected entity 910 to determine what type of date is specified in key phrase 900. In some embodiments, a linguistic model identifies that a date entity is included in key phrase 900, and this identification is passed to date generation model 910. In some embodiments, the linguistic model is a part of date generation model 910. Once the type of date is determined by date generation model 905, then the value associated with the date (e.g., as detected by a value detection model) is correctly inserted into a hierarchical query.

In one example, a database schema includes three date types: "relative", "past", and "future". Embodiments of date generation model 905 include an LM (e.g., a T5 model) that is trained to identify the date type included in a text query. In some cases, date generation model 905 is trained using a few-shot learning process to identify the date types supported by the database schema. For example, the few-shot learning process includes providing the LM with input/output samples similar to: ("detect timestamp: today", "relative"), ("detect timestamp: last 3 hours", "past"), ("detect timestamp: next 2 hours", "future"), ("detect timestamp: this month", "relative"), etc.

Figure 10:
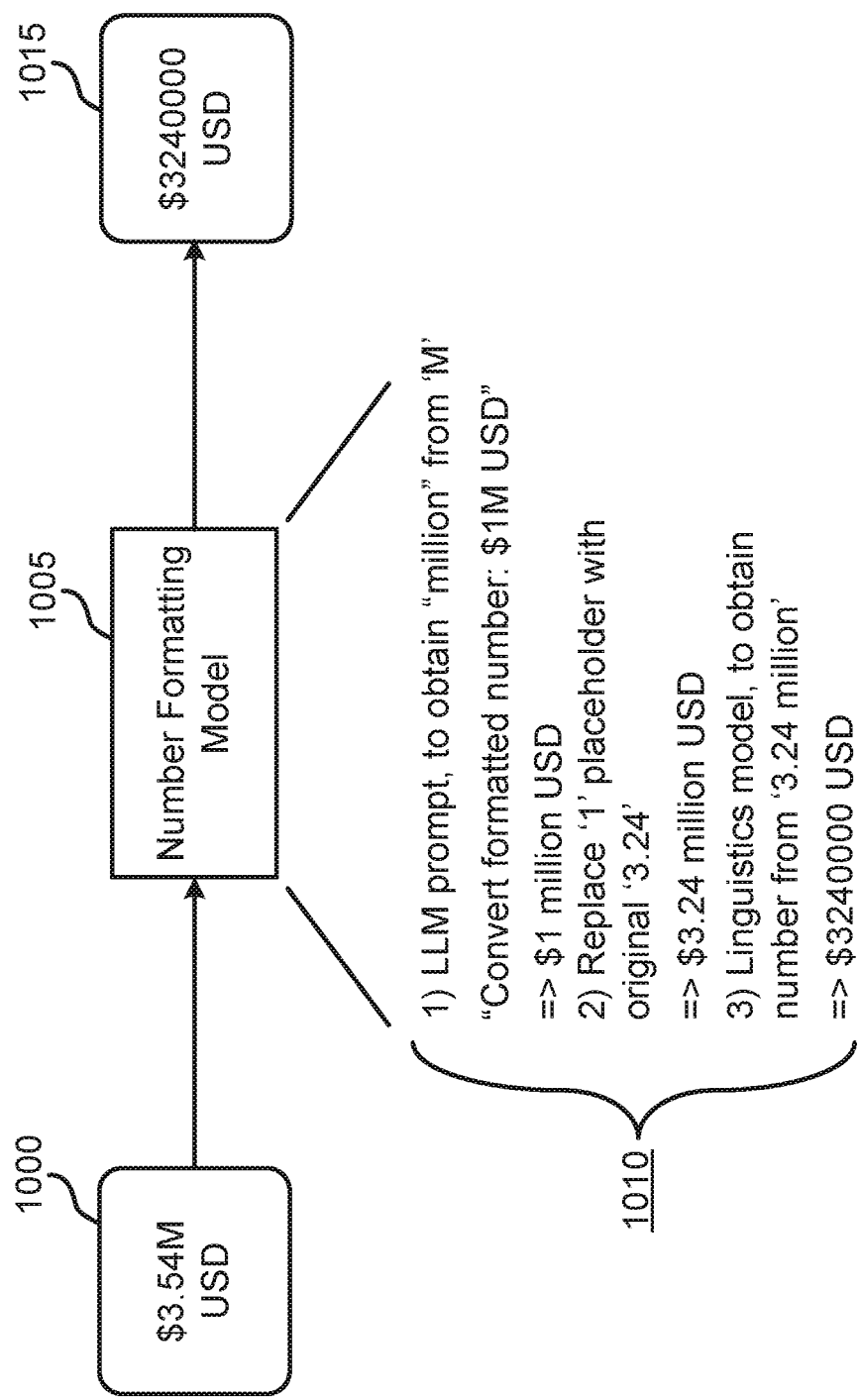
FIG. 10 shows an example of a number formatting pipeline according to aspects of the present disclosure.

FIG. 10 shows an example of a number formatting pipeline according to aspects of the present disclosure. The example shown includes key phrase 1000, number formatting model 1005, number formatting sub-operations 1010, and output 1015. Number formatting model 1005 is an example of, or includes aspects of, the corresponding element described with reference to FIGS. 2 and 3.

In the example pipeline shown, number formatting model 1005 processes key phrase 1000 using number formatting sub-operations 1010 to produce output 1015. In this example, number formatting model 1005 includes an LM or LLM configured to identify shorthands, abbreviations, or other variations of numbers. For example, the LM identifies "5K" as "5 thousand", "10M" as "10 million". In some cases, the numbers from key phrase 1000 are replaced with simply "1" to increase accuracy before the LM is prompted. The result from the LM is then changed to include the original number, and a linguistics model is used to replace the word with a numeric value. For example, the linguistics model uses, e.g., Regular Expressions to replace "thousand" with "1000" and "million" with "1000000". This is merely one example, and the number formatting model 1005 is variably altered to ensure that output 1015 adheres to a different database schema, for example.

Generating Hierarchical Queries

A method for generating queries from natural language description is described. One or more aspects of the method include encoding a text query to obtain a text embedding; selecting a field of a data schema by comparing the text embedding to a field embedding corresponding to the field; and generating a hierarchical query including a value corresponding to the selected field.

Some examples of the method, apparatus, non-transitory computer readable medium, and system further include extracting a key phrase from the text query, wherein the text embedding represents the key phrase. Some examples further include generating a hierarchy of key phrases for the text query, wherein the key phrase corresponds to a node in the hierarchy. Some examples further include generating a list of key phrases for the text query, wherein the key phrase corresponds to an element of the list.

Some examples of the method, apparatus, non-transitory computer readable medium, and system further include generating a value for the field using an operator detection model, wherein the value includes a mathematical operator. Some examples further include applying an operator filter to the text query, wherein the operator detection model is used based on the operator filter.

Some examples of the method, apparatus, non-transitory computer readable medium, and system further include generating a value for the field using a value detection model, wherein the value represents a discrete value in the text query. Some examples further include generating a value for the field using a Boolean detection model, wherein the value comprises a Boolean value. Some examples further include generating a value for the field using a date generation model, wherein the value comprises a date. Some examples further include generating a value for the field using a number formatting model, wherein the value comprises a number. Some examples further include generating a segment of user data based on the hierarchical query.

Figure 11:
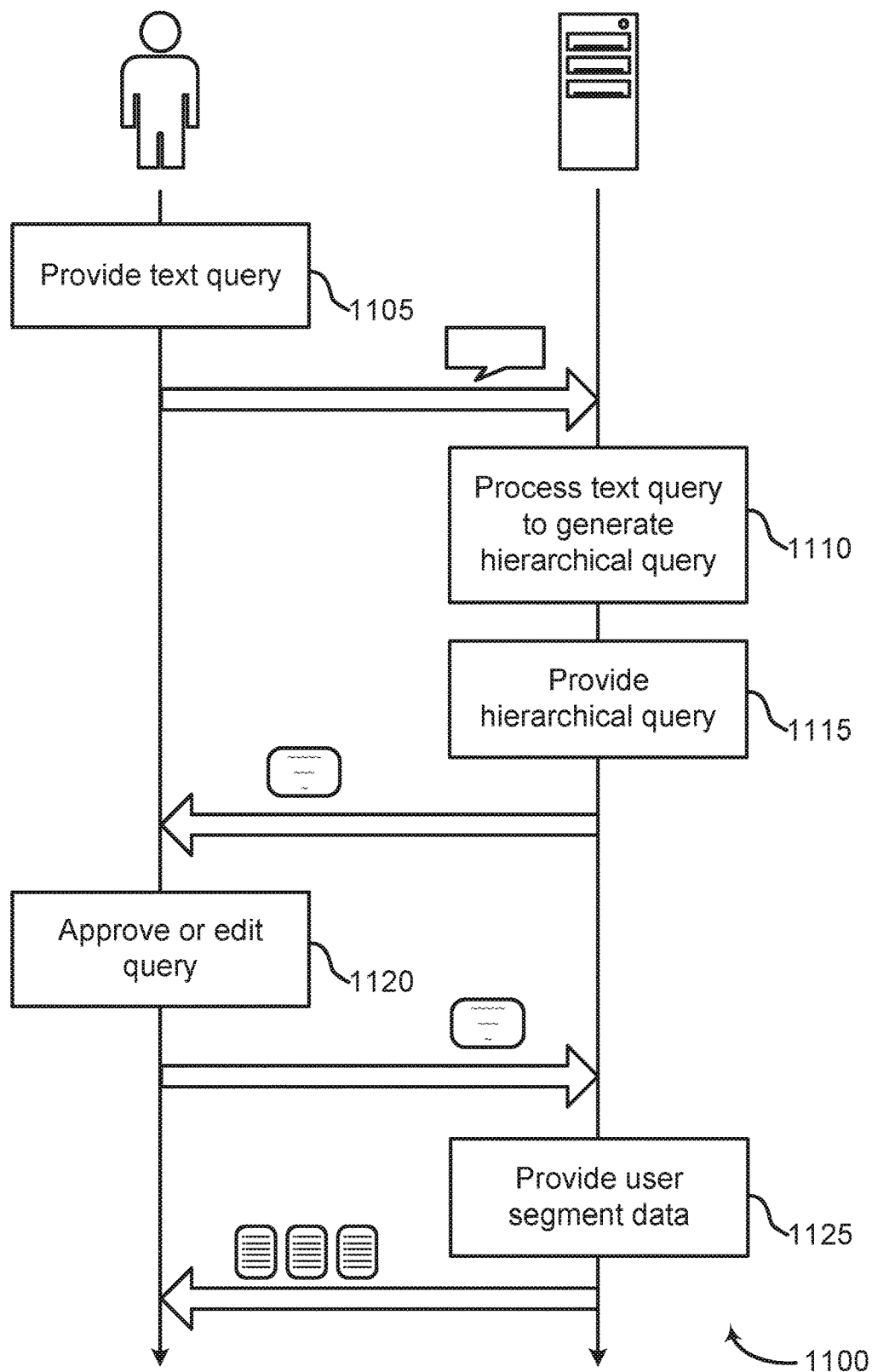
FIG. 11 shows an example of a method for generating a hierarchical query and returning user segment data based on the hierarchical query according to aspects of the present disclosure.

FIG. 11 shows an example of a method 1100 for generating a hierarchical query and returning user segment data based on the hierarchical query according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, a user provides a text query. The user does so via a user interface as described with reference to FIG. 1. In some examples, the user interface includes a GUI, and is implemented as, e.g., a web application. The text query is a natural language description of a set of data the user wishes to retrieve from a database.

At operation 1110, the system processes the text query to generate a hierarchical query. For example, the system processes the text query according to the processes described with reference to FIG. 3. The system infers hierarchical information from the text query using a machine learning model, and further adapt the information in the text query to be compatible with a schema of the database using attribute extraction and formatting models.

At operation 1115, the system provides the hierarchical query to the user. For example, the system displays the hierarchical query to the user via the user interface.

At operation 1120, the user approves or edits the hierarchical query. At this operation, the user approves the query without changes, or makes edits to the query via the user interface.

At operation 1125, the system provides user segment data. In this example, the database is configured to store accounts of various users. The accounts in the database is filtered according to the conditions set in the hierarchical query, and the resulting accounts are referred to as a "user segment" or "user segment data". For example, the querying user then sends a message to these accounts, or make changes to the accounts. In some embodiments, the operations performed by the user is performed autonomously by another system designed to gather metrics from the database.

Figure 12:
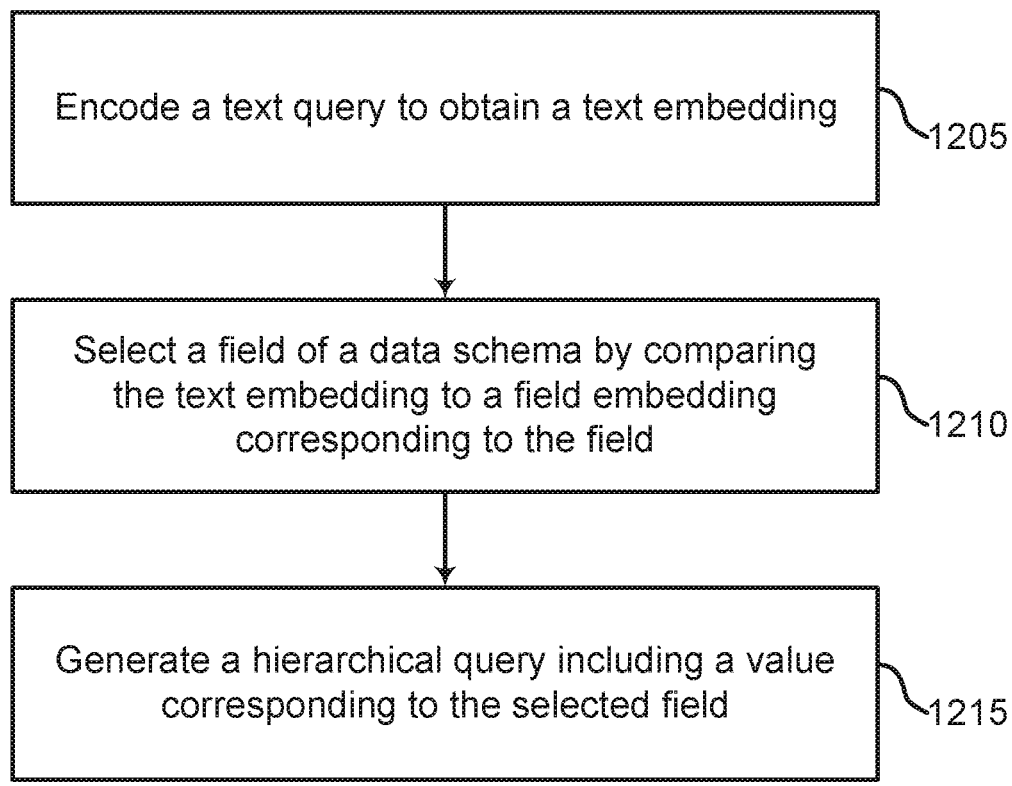
FIG. 12 shows an example of a method for generating a hierarchical query from text according to aspects of the present disclosure.

FIG. 12 shows an example of a method 1200 for generating a hierarchical query from text according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system encodes a text query to obtain a text embedding. In some cases, the operations of this step refer to, or is performed by, a text encoder as described with reference to FIGS. 2, 3, and 5. Embeddings are vectors which capture semantic and syntactic information.

At operation 1210, the system selects a field of a data schema by comparing the text embedding to a field embedding corresponding to the field. In some cases, the operations of this step refer to, or is performed by, a key phrase mapping component as described with reference to FIGS. 2 and 3. For example, the key phrase mapping component computes a cosine similarity between the text embedding and the field embedding, and make the selection based on the computed cosine similarity.

At operation 1215, the system generates a hierarchical query including a value corresponding to the selected field. In some cases, the operations of this step refer to, or is performed by, a query composer as described with reference to FIGS. 2 and 3. According to some aspects, the query composer generates the hierarchical query by inserting the selected field and the value into a query template.

Training

A method for generating queries from natural language description is described. One or more aspects of the method include initializing a machine learning model; obtaining training data including a text query and a ground-truth hierarchy of key phrases corresponding to the text query; and training the machine learning model to generate a hierarchy of key phrases based on the text query using the training data. In some aspects, the text query comprises a search query, and the ground-truth hierarchy of key phrases corresponds to fields in a hierarchical schema. Some examples of the method, apparatus, non-transitory computer readable medium, and system further include sorting the training data based on length or hierarchical depth, wherein the training is based on the sorted training data.

Figure 13:
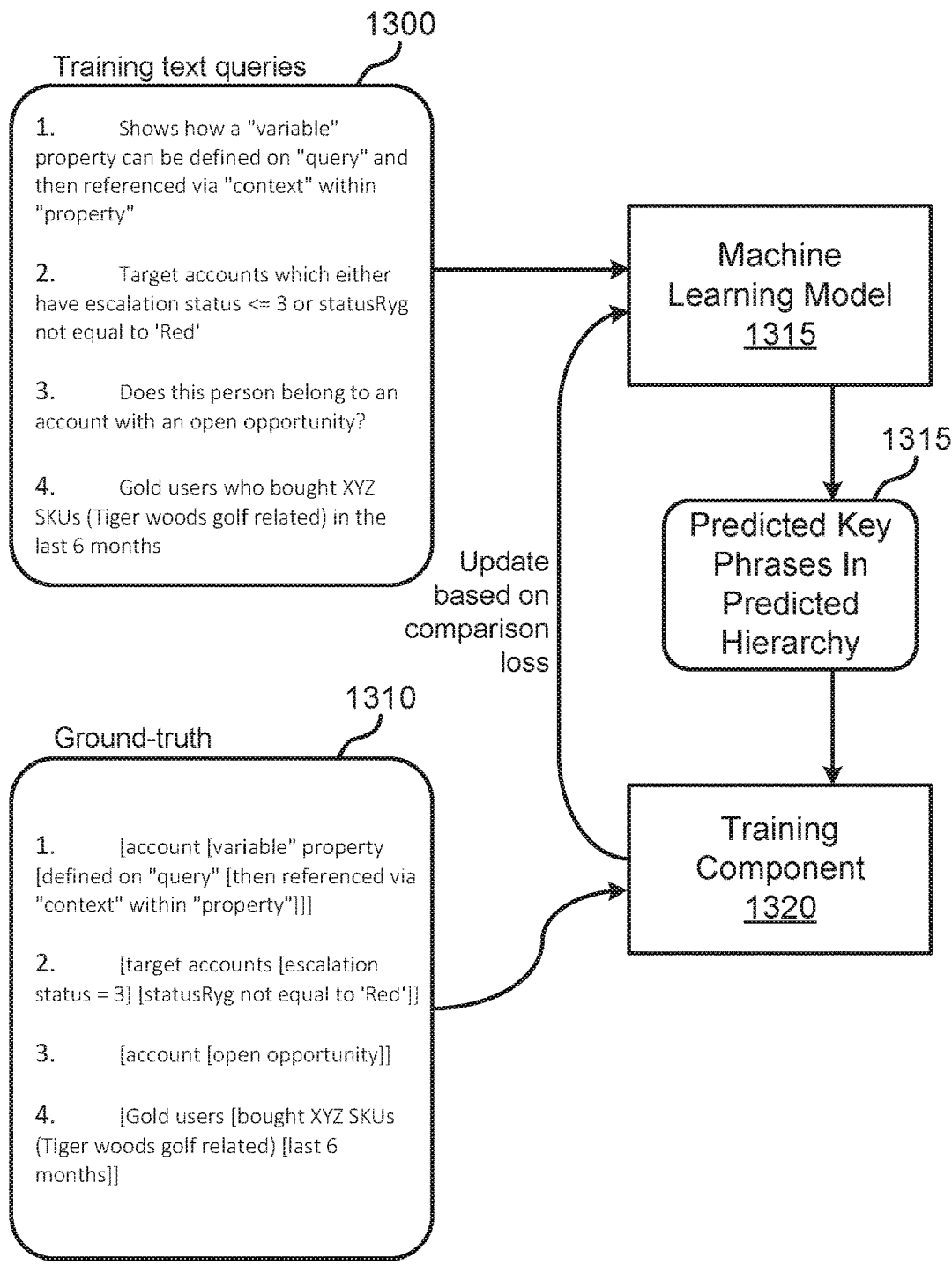
FIG. 13 shows an example of training data according to aspects of the present disclosure.

FIG. 13 shows an example of training data according to aspects of the present disclosure. The example shown includes training text queries 1300, predicted key phrases in predicted hierarchy 1305, ground-truth key phrases arranged in ground-truth hierarchy 1310, machine learning model 1315, and training component 1320. Machine learning model 1315 is an example of, or includes aspects of, the corresponding element described with reference to FIGS. 2-4. Training component 1320 is an example of, or includes aspects of, the corresponding element described with reference to FIG. 2.

In the example shown, machine learning model 1315 receives training text queries 1300 and generates predicted key phrases in predicted hierarchy 1305. In some embodiments, machine learning model 1315 is or is based on an LLM model such as a T5 model. At least one embodiment of machine learning model 1315 includes a Flan-T5-base LLM model.

Training component 1320 compares predicted key phrases in predicted hierarchy 1305 to the target outputs for training text queries 1300, i.e., ground-truth key phrases arranged in ground-truth hierarchy 1310. In some cases, training component 1320 computes a loss based on the difference between predicted key phrases in predicted hierarchy 1305 and ground-truth key phrases arranged in ground-truth hierarchy 1310. Then, training component 1320 updates parameters of machine learning model 1315 based on this loss.

Figure 14:
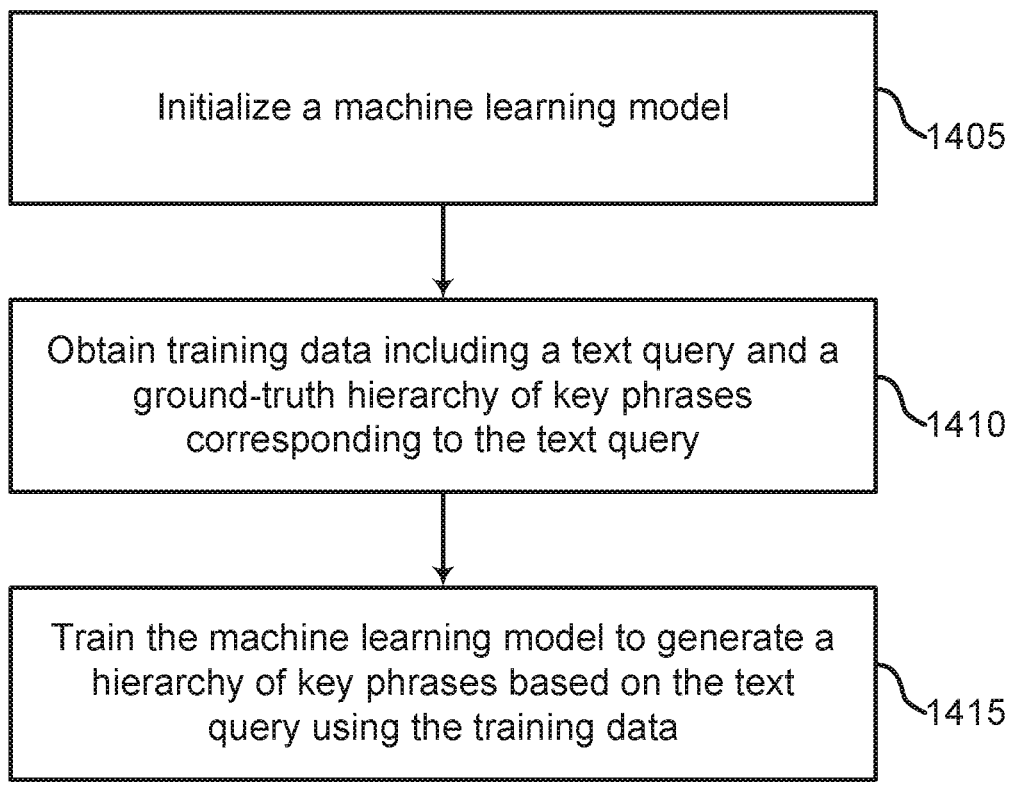
FIG. 14 shows an example of a method for training a machine learning model according to aspects of the present disclosure.
Figure 15:
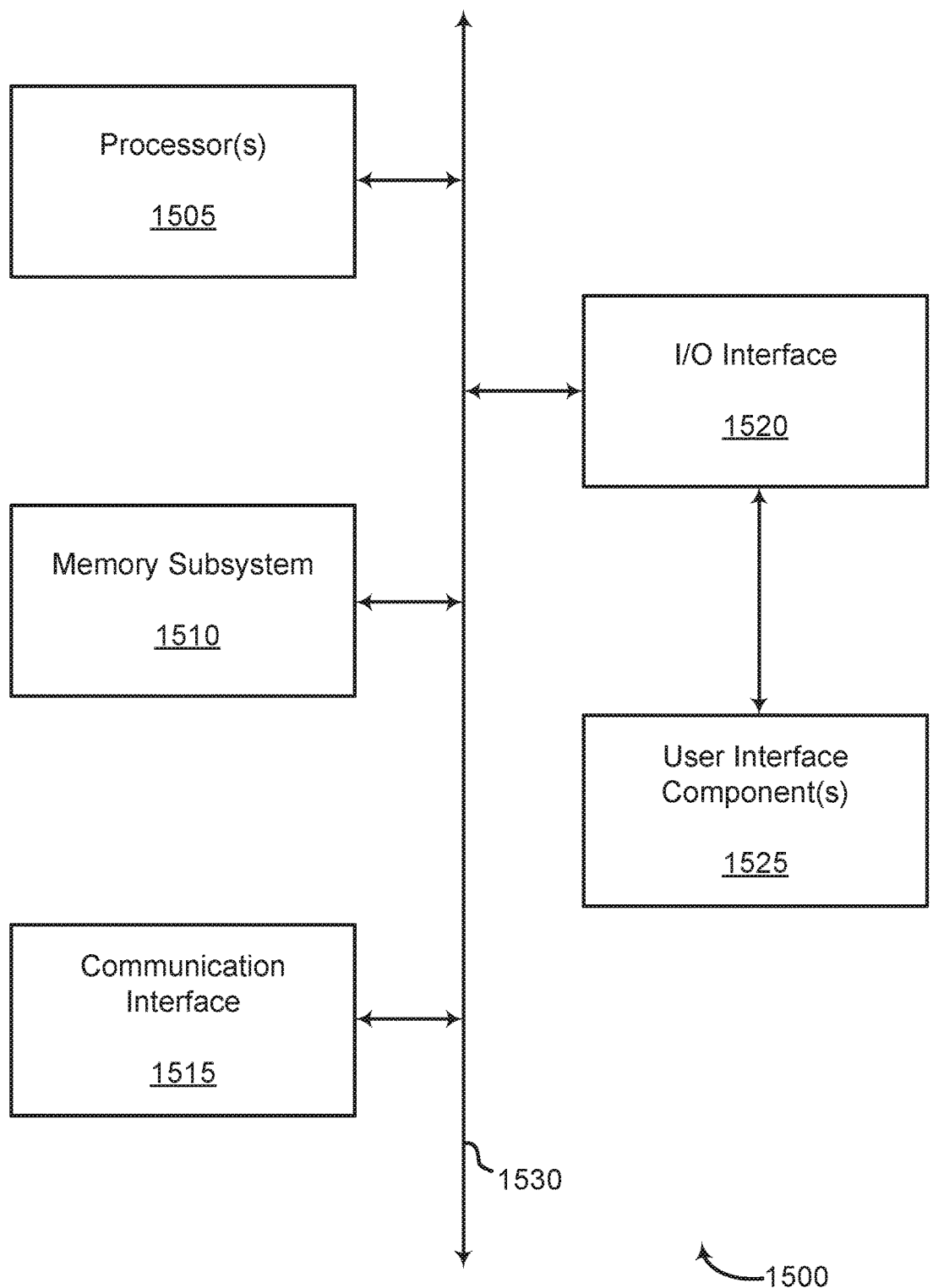
FIG. 15 shows an example of a computing device according to aspects of the present disclosure.

FIG. 14 shows an example of a method 1400 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system initializes a machine learning model. In some cases, the operations of this step refer to, or is performed by, a query generation apparatus as described with reference to FIGS. 1 and 2. For example, the system obtains a pre-trained LM or LLM based on a T5 architecture.

At operation 1410, the system obtains training data including a text query and a ground-truth hierarchy of key phrases corresponding to the text query. In some cases, the operations of this step refer to, or is performed by, a query generation apparatus as described with reference to FIGS. 1 and 2. The training data is formatted based on the training text queries and ground-truth key phrases as described in FIG. 13.

At operation 1415, the system trains the machine learning model to generate a hierarchy of key phrases based on the text query using the training data. In some cases, the operations of this step refer to, or is performed by, a training component as described with reference to FIGS. 2 and 13. For example, the training component updates the machine learning model based on a comparison loss between a predicted hierarchy of key phrases and a ground-truth hierarchy of key phrases.

FIG. 13 shows an example of a computing device 1300 according to aspects of the present disclosure. The example shown includes computing device 1300, processor(s) 1305, memory subsystem 1310, communication interface 1315, I/O interface 1320, user interface component(s), and channel 1330.

In some embodiments, computing device 1300 is an example of, or includes aspects of, query generation apparatus 100 of FIG. 1. In some embodiments, computing device 1300 includes one or more processors 1305 are configured to execute instructions stored in memory subsystem 1310 to encode a text query to obtain a text embedding; select a field of a data schema by comparing the text embedding to a field embedding corresponding to the field; and generate a hierarchical query including a value corresponding to the selected field.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory stores various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

The description and drawings described herein represent example configurations and do not represent all the implementations within the scope of the claims. For example, the operations and steps is rearranged, combined or otherwise modified. Also, structures and devices is represented in the form of block diagrams to represent the relationship between components and avoid obscuring the described concepts. Similar components or features have the same name but have different reference numbers corresponding to different figures.

Some modifications to the disclosure is readily apparent to those skilled in the art, and the principles defined herein is applied to other variations without departing from the scope of the disclosure. Thus, the disclosure is not limited to the examples and designs described herein, but is to be accorded the broadest scope consistent with the principles and novel features disclosed herein.

The described methods is implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor is a microprocessor, a conventional processor, controller, microcontroller, or state machine. A processor is also be implemented as a combination of computing devices (e.g., a combination of a DSP and a microprocessor, multiple microprocessors, one or more microprocessors in conjunction with a DSP core, or any other such configuration). Thus, the functions described herein is implemented in hardware or software and is executed by a processor, firmware, or any combination thereof. If implemented in software executed by a processor, the functions is stored in the form of instructions or code on a computer-readable medium.

Computer-readable media includes both non-transitory computer storage media and communication media including any medium that facilitates transfer of code or data. A non-transitory storage medium is any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components is properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" is based on both condition A and condition B. In other words, the phrase "based on" shall be construed to mean "based at least in part on." Also, the words "a" or "an" indicate "at least one."

What is claimed is:

1. A method implemented by a computing device including at least one processor, the method comprising:
    encoding, using a text encoder, a text query to obtain a text embedding, wherein the text query comprises a natural language text query;
    selecting, using a key phrase mapping component, a field of a data schema by comparing the text embedding to a field embedding corresponding to the field, wherein the data schema comprises one or more hierarchical rules constraining the use of the field for querying data based on a hierarchy of attributes; and
    generating, using a query composer, a hierarchical query including a value corresponding to the selected field by predicting a next word in a sequence of words based on a positional encoding for the next word, wherein the hierarchical query comprises a hierarchy of nested descriptors corresponding to the hierarchy of attributes in a database.

2. The method of claim 1, further comprising:
    extracting, using a machine learning model, a key phrase from the text query, wherein the text embedding represents the key phrase.

3. The method of claim 2, further comprising:
    generating, using the machine learning model, a hierarchy of key phrases for the text query, wherein the key phrase corresponds to a node in the hierarchy.

4. The method of claim 2, further comprising:
generating, using the machine learning model, a list of key phrases for the text query, wherein the key phrase corresponds to an element of the list.

5. The method of claim 1, further comprising:
generating a value for the field using an operator detection model, wherein the value includes a mathematical operator.

6. The method of claim 5, further comprising:
applying an operator filter to the text query, wherein the operator detection model is used based on the operator filter.

7. The method of claim 1, further comprising:
generating a value for the field using a value detection model, wherein the value represents a discrete value in the text query.

8. The method of claim 1, further comprising:
generating a value for the field using a Boolean detection model, wherein the value comprises a Boolean value.

9. The method of claim 1, further comprising:
generating a value for the field using a date generation model, wherein the value comprises a date.

10. The method of claim 1, further comprising:
generating a value for the field using a number formatting model, wherein the value comprises a number.

11. The method of claim 1, further comprising:
generating a segment of user data based on the hierarchical query.

12. A method implemented by a computing device including at least one processor, the method comprising:
initializing a machine learning model;
obtaining training data including a text query and a ground-truth hierarchy of key phrases corresponding to the text query, wherein the text query comprises a natural language text query; and
training the machine learning model to generate, by predicting a next word in a sequence of words based on a positional encoding for the next word, a hierarchy of key phrases based on the text query using the training data.

13. The method of claim 12, wherein:
the text query comprises a search query, and the ground-truth hierarchy of key phrases corresponds to fields in a hierarchical schema.

14. The method of claim 12, further comprising:
sorting the training data based on length or hierarchical depth, wherein the training is based on the sorted training data.

15. An apparatus comprising:
at least one processor;
at least one memory including instructions executable by the at least one processor;
the apparatus further comprising a machine learning model including parameters stored on the at least one memory and configured to generate a hierarchy of key phrases from a text query by predicting a next word in a sequence of words based on a positional encoding for the next word, wherein the text query comprises a natural language text query;
a key phrase mapping component configured to identify a field of a data schema, wherein the field corresponds to a key phrase of the hierarchy of key phrases, and wherein the data schema comprises one or more hierarchical rules constraining the use of the field for querying databased on a hierarchy of attributes; and
a query composer configured to generate a hierarchical query including a value corresponding to the field, wherein the hierarchical query comprises a hierarchy of nested descriptors corresponding to the hierarchy of attributes in a database.

16. The apparatus of claim 15, further comprising:
a text encoder configured to generate a text embedding from the text query.

17. The apparatus of claim 15, further comprising:
an operator detection model configured to identify a mathematical operator in the text query.

18. The apparatus of claim 15, further comprising:
a value detection model configured to identify a discrete value in the text query.

19. The apparatus of claim 15, further comprising:
a Boolean detection model configured to identify a negation in the text query.

20. The apparatus of claim 15, further comprising:
a date generation model configured to identify a date from the text query.

* * * * *